United States Patent [19]

Park

[11] Patent Number: 4,635,377

[45] Date of Patent: Jan. 13, 1987

[54] T-SQUARE APPARATUS

[76] Inventor: Joon Park, 1128 E. Raleigh St., Glendale, Calif. 91205

[21] Appl. No.: 720,625

[22] Filed: Apr. 5, 1985

[51] Int. Cl.⁴ .................................................. G01C 9/24
[52] U.S. Cl. ........................................ 33/451; 33/381; 33/404
[58] Field of Search ................. 33/451, 415, 382, 416, 33/417, 474, 479, 481, 404, 403, 381

[56] References Cited

U.S. PATENT DOCUMENTS

| | | |
|---|---|---|
| 778,808 | 12/1904 | Starrett .............................. 33/451 X |
| 1,892,622 | 12/1932 | Mayes . |
| 2,113,524 | 4/1938 | Wolfe . |
| 2,635,350 | 4/1953 | Bettega . |
| 2,973,584 | 3/1961 | Snapp . |
| 3,180,036 | 4/1965 | Meeks . |
| 3,187,437 | 6/1965 | Ellis ....................................... 33/451 |
| 3,311,990 | 4/1967 | Wright . |
| 3,513,558 | 5/1970 | Kuchta et al. . |
| 3,524,259 | 8/1970 | Handley ............................ 33/382 X |
| 4,404,753 | 9/1983 | Klok ..................................... 33/451 |

FOREIGN PATENT DOCUMENTS

| | | | |
|---|---|---|---|
| 12070 | of 1912 | United Kingdom .................. 33/415 |
| 1227123 | 4/1971 | United Kingdom .................. 33/382 |

Primary Examiner—William D. Martin, Jr.
Attorney, Agent, or Firm—Christie, Parker & Hale

[57] ABSTRACT

An adjustable T-square apparatus comprising a generally triangular frame having first and second working surfaces normal to each other and a third working surface at a 45° angle to the first and second working surfaces is disclosed. The apparatus further comprises three level vials mounted on the frame in parallel relation to separate working surfaces. A pair of measuring blades are slidably mounted on the frame in parallel relation to the first and second working surfaces.

9 Claims, 4 Drawing Figures

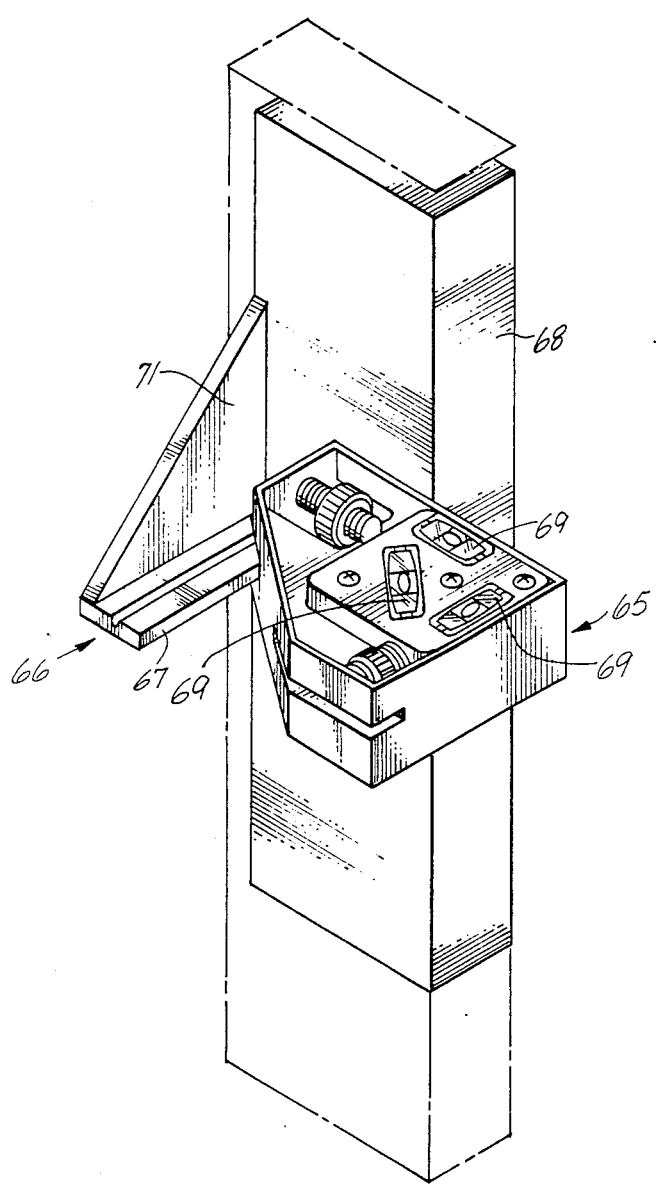

T-SQUARE APPARATUS

FIELD OF THE INVENTION

This invention relates to adjustable T-squares and in particular to an adjustable T-square apparatus comprising a triangular frame having three working surfaces, three level vials mounted on the frame in parallel relation to each of the working surfaces, and a pair of measuring blades in parallel relation to two of the working surfaces.

BACKGROUND OF THE INVENTION

Adjustable T-squares typically comprise a frame having a generally flat working surface with a measuring blade slidably mounted on the frame at the end of the working surface and normal to the working surface. Such devices often comprise a level vial mounted on the frame in parallel relation to the working surface.

Conventional adjustable T-square devices are suitable for checking the accuracy of external right angle corners formed by two abutting objects such as pieces of wood, but generally cannot be used to check the accuracy of internal corners formed by such objects, particularly if the internal corner is rounded.

If it has a level vial, the T-square can be used to check deviations from true horizontal of a surface but can only check deviations from vertical of a generally vertical surface if that surface forms an external right angle with a true horizontal surface. Further, there are many corners formed by angles other than right angles, particularly at 45° angles, whose accuracy cannot be checked by conventional adjustable T-squares.

Accordingly, there is a need for an adjustable T-square which can be used on internal corners as well as external corners, which can be used with angles other than right angles and which can accurately check the accuracy of vertical and horizontal surfaces.

SUMMARY

Accordingly, there is provided an adjustable T-square apparatus comprising a generally triangular frame having first, second and third legs which comprise first, second and third generally flat working surfaces respectively. The first and second working surfaces are generally normal to each other and the third working surface extends between the first and second working surfaces at a select angle, preferably 45°, to the first and second working surfaces. Three level vials are mounted on the frame so that each vial is in parallel relation to a separate working surface.

The level vials are preferably incorporated in a level vial assembly which can be pre-assembled and then mounted on the frame. The level vial assembly comprises a mounting plate and three level vials which are mounted on the mounting plate in a generally triangular orientation wherein the axes of the first and second vials are normal to each other and the axis of the third vial is at select angles, again preferably 45°, to the axes of the first and second vials. The axes of all three vials are preferably coplanar. The mounting plate is mountable on the frame so that each level vial is in parallel relation to a separate working surface of the frame.

The T-square apparatus further comprises at least one measuring blade and means for mounting the measuring blade on the frame so that the edges of the measuring blade are in parallel relation to one of the working surfaces of the frame.

In a preferred embodiment of the invention, the T-square apparatus comprises a pair of measuring blades and means for mounting the measuring blades normal to each other and in parallel relation to the first and second working surfaces of the frame. In such an embodiment, it is preferred that the measuring blades be mounted at the corners formed by the junction of the first and third legs and by the junction of the second and third legs.

In a particularly preferred embodiment of the invention, the T-square apparatus comprises a blade attachment for checking deviations from vertical of upright members such as studs, posts and the like. The blade attachment comprises a blade having an L-shaped angle bar fixedly attached at its end in an orientation normal to the blade so that when the blade and level vials of the T-square apparatus are horizontal, both walls of the angle bar are vertical.

BRIEF DESCRIPTION OF THE DRAWINGS

These and other features and advantages of the present invention will be better understood by reference to the following detailed description when considered in conjunction with the accompanying drawings wherein:

FIG. 4 is a perspective view of another preferred T-square apparatus.

DETAILED DESCRIPTION

Figure 1:
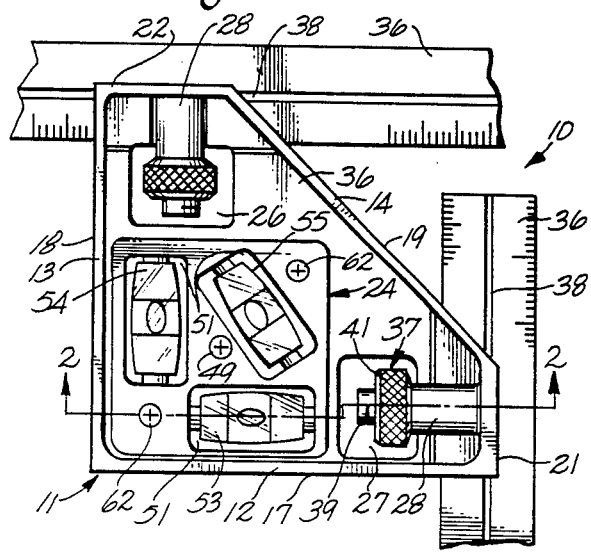
FIG. 1 is a top view of a preferred T-square apparatus constructed in accordance with the present invention.
Figure 2:
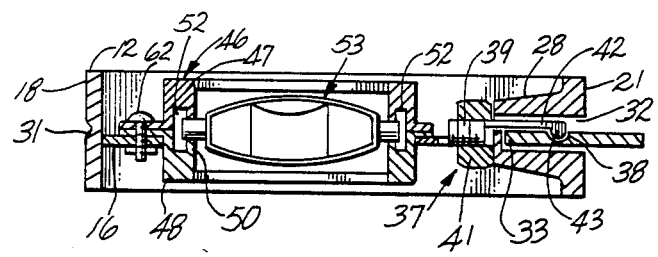
FIG. 2 is a side cross-sectional view of the T-square apparatus of FIG. 1 along lines 2—2.

A preferred adjustable T-square apparatus constructed in accordance with the present invention is shown in FIGS. 1 and 2. The T-square apparatus 10 comprises a generally triangular frame 11 having a first leg 12, a second leg 13, a third leg 14 and an internal web 16. The first and second legs are generally the same length and extend in a direction generally normal to each other. The third leg 14 extends from the end of the first leg 12 remote from the second leg 13 to the end of the second leg 13 remote from the first leg 12.

The first leg 12 comprises a generally flat rectangular exterior working surface 17 which extends the full length of the first leg 12. Likewise, the second leg 13 comprises a generally flat rectangular exterior working surface 18 which extends full length of the second leg 13. The first and second working surfaces 17 and 18 are generally normal to each other and form a right angle at this junction. The third leg 14 comprises a generally rectangular middle or third working surface 19 which is oriented at an angle of about 45° from each of the first and second working surfaces 17 and 18.

The third leg 14 also comprises two short generally flat rectangular corner working surfaces 21 and 22 which extend in a direction normal to the first and second working surfaces 17 and 18 respectively and connect the third working surface 19 with the first and second working surfaces 17 and 18. The upper and lower edges of all working surfaces are generally coplanar.

The web 16 of the frame 11 has three openings, a first large level vial assembly opening for receiving a level vial assembly 24 and two smaller measuring blade assembly openings 26 and 27 adjacent the corners formed by first and third legs 12 and 14 and by the second and third legs 13 and 14 respectively.

Between each measuring blade assembly opening 26 and 27 and the adjacent end corner working surfaces 21 and 22, the web 16 comprises a generally cylindrical hollow barrel 28. The hollow interior of the barrel 28 extends from about the midpoint of the corner working surfaces 21 or 22 to the measuring blade assembly opening 26 or 27 in a direction generally normal to that corner working surface.

As shown in FIG. 2, the second working surface 18 comprises a V-shaped groove 31 which extends lengthwise along the second working surface 18 at about its midpoint. The first and third working surfaces 17 and 19 (not shown) have a similar groove. The grooves 31 of the first, second and third working surfaces are generally coplanar. The grooves 31 provide a means for aligning the working surface generally parallel to the axis of a cylindrical object, such as a pipe or the like.

The frame 11 further comprises a pair of generally straight slots 32 which extend into the frame 11 along each corner working surface 21 and 22 of the third leg 14 in a direction generally normal to the corner working surface 21 and 22. The slots 32 extend from the middle working surface 19 of the third leg 13 to the first and second working surfaces 17 and 18 of the first and second legs 12 and 13, respectively. The slots 32 pass through the barrels 28. At the bottom of each slot 32 is a generally flat, straight surface 33 generally parallel to the corner working surface 21 or 22 and hence generally parallel to the first or second working surface 17 or 18 of the non-adjacent leg.

The T-square apparatus 10 further comprises a pair of measuring blades 36 mounted in the slots 32 of the frame 11 at each of the corners formed at the juncture of the first and third legs 12 and 14 and at the juncture of the second and third legs 13 and 14. The measuring blades 36 are retained in the slots 32 by a measuring blade retaining assembly 37.

Each measuring blade 36 is an elongated rectangular plate having a groove 38 along one or both sides which extends the length of the blade, preferably at about the midpoint of the blade's width. The measuring blade 36 typically has indicia on one or both sides, marking, for example, inches and/or centimeters and fractions thereof. The length of the measuring blade 36 is not critical, however, the width is selected so that, when assembled on the frame, the groove 38 passes within the slot 32.

Each measuring blade retaining assembly 37 comprises a threaded retaining shaft 39 which extends through the barrel 28 and into the measuring blade assembly opening 26 or 27 in the web 16 of the frame 11. An adjusting ring 41 is threaded onto the end of the retaining shaft 39 which extends into the measuring blade assembly opening 26 or 27. At the end of the retaining shaft 39 opposite the adjusting ring 41, the retaining shaft 39 comprises an extension 42 having a tang 43 at its end. The extension 42 lies along one side of the measuring blade 36 when the measuring blade 36 is mounted in the slot 32 so that the tang 43 engages the groove 38 in the measuring blade 36.

In such an arrangement, rotation of the adjusting ring 41 in one direction causes the retaining shaft 39, and hence the measuring blade 36, to move toward the bottom of the slot 32 until it engages and is tightened against the bottom surface 33 of the slot 32. Rotation of the adjusting ring 41 in the opposite direction loosens the measuring blade 36 and allows the measuring blade 36 slidable lengthwise movement within the slot 32.

A level vial assembly 24 is mounted in the level vial assembly opening 23 of the web 16 by screws 62. The level vial assembly 24 comprises a vial holder 46 having upper and lower sections 47 and 48, respectively, which are held together by any suitable means such as screw 49. The vial holder has three generally rectangular openings 51. At each end of each opening 51, the vial holder 46 comprises a cylindrical recess 52 for receiving the ends of a level vial. An annular lip 50 extends around the cylindrical recess 52 to center the ends of the vial in the recess 52 and to prevent movement of the vials relative to the vial holder 46. The level vial assembly 24 further comprises three level vials 53, 54 and 55 which are mounted in the vial holder.

Figure 3:
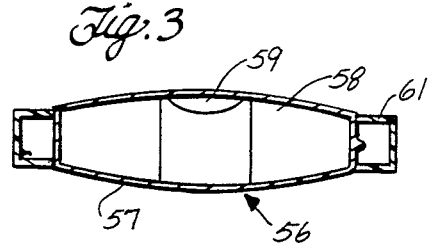
FIG. 3 is a side cross-sectional view of a preferred level vial.

The level vials 53, 54, and 55 may be any suitable level vial which is used in conventional levels. A preferred level vial is shown in FIG. 3 and comprises a transparent container 56 having a generally barrel-shaped side wall 57, i.e., the diameter of the side wall 57 being slightly greater at its midpoint than at its ends. The container 56 is made of glass or a transparent plastic and is filled with a fluid 58 except for one small bubble 59. A pair of cylindrical end caps 61 are fixedly attached to the container and extend from the ends of the container 56 coaxially with the container 56. The end caps 61 are preferably made of plastic and are attached to the container by glue or any other suitable means.

The level vials 53, 54, and 55 lie lengthwise through the openings 51 of the vial holder, the end caps 61 of the level vials 53 being disposed in the recesses 52 of the vial holder 46 at each end of the openings 51 and held in place by the annular lips 50. The openings 51 and recesses 52 are positioned relative to each other so that the level vials 53, 54 and 55 have a select orientation to each other when assembled in the vial holder 46.

Specifically, the openings 51 and recesses 52 are arranged so that the axes of the three level vials 53, 54 and 55 are coplanar and that the axis of the first vial 53 is generally normal to the axis of the second vial 54 and the axis of the third vial 55 is at about a 45° angle to the axes of the first and second vials 53 and 54, respectively.

The level vial assembly 24 is mounted on the web 16 of the frame 11 so that the plane of the axes of the level vials 53, 54 and 55 are in parallel relation to the first, second and third vials to the working surfaces 17, 18 and 19 respectively of the frame 11.

As used herein, the phrase "in parallel relation" refers to an orientation between a level vial or a measuring blade and a working surface wherein the axis of a level vial or the edges along the length of the measuring blade are generally parallel to the groove which extends the length of the working surface along its midpoint. The axis of the level vial or the edges of the measuring blade are thus also generally parallel to the top and bottom edges of the working surface. In the case of the measuring blade, the plane of the measuring blade is substantially normal to the planes of all of the working surfaces.

Mounting of the level vial assembly 24 on the web 16 of the frame 11 may be by suitable means such as by screws 62 which extend through the vial holder 46 and are threaded into appropriately positioned screw holes in the web 16 of the frame 11.

In a particularly preferred embodiment of the invention, as shown in FIG. 4, the T-square apparatus 65 comprises a blade attachment 66 for checking the vertical orientation of a post or any other structure having a vertically extending corner. The blade attachment 66 comprises a measuring blade 67 generally as described above and a generally L-shaped angle bar 68 having a pair of elongated walls which extend at right angles to each other. The angle bar 68 is fixedly attached to one end of the measuring blade 67, e.g., by welding, so that when the measuring blade 67 and all of the level vials 69 of the T-square apparatus 65 are horizontal, both walls of the angle bar 68 are vertical. In this embodiment, the plane of the measuring blade 67 is normal to the planes of both walls of the angle bar 68. A reinforcing bracket 71 attached to both the measuring blade 67 and angle bar 68 does not change.

The preceding description has been presented with reference to the presently preferred embodiment of the invention shown in the accompanying drawings. Workers skilled in the art and technology to which this invention pertains will appreciate that alterations and changes in the described apparatus and structure can be practiced without meaningfully departing from the principles, spirit and scope of this invention.

For example, it is apparent that any suitable level vials can be used in the invention. Likewise any suitable means for mounting the level vials on the frame can be used. If a separate vial holder is used, any suitable means for mounting the vials on the vial holder may be used.

In the embodiment of the invention described above, the T-square apparatus comprises two measuring blades. It is apparent that the apparatus may comprise only one measuring blade, if desired. Further, any means for slidably mounting the measuring blades on the frame may be used.

Accordingly, the foregoing description should not be read as pertaining only to the precise structures and procedures described, but rather should be read consistent with and as support for the following claims which are to have their fullest fair scope.

What is claimed is:

1. A T-square apparatus comprising:
   a generally triangular frame having a first generally flat working surface, a second generally flat working surface and a third generally flat working surface oriented at select angles to the first and second working surfaces;
   three level vials;
   means for mounting the level vials on the frame whereby one level vial is in parallel relation to each working surface;
   a measuring blade;
   a generally L-shaped angle bar having generally flat first and second walls generally normal to each other, said angle bar being fixedly attached to one end of the measuring blade whereby the plane of the measuring blade is generally normal to the planes of the first and second walls; and
   means for slidably mounting the measuring blade on the frame in parallel relation to one of the working surfaces.

2. A T-square apparatus as claimed in claim 1 wherein the means for mounting the level vials on the frame comprises a level vial holder having three compartments for receiving the three level vials in an orientation whereby the axis of the first vial is generally normal to the axis of the second vial and the axis of the third vial is at selected angles to the axes of the first and second vials, said level vial holder being mounted on the frame so that the first, second and third vials are in parallel relation to the first, second and third working surfaces of the frame respectively.

3. A T-square apparatus as claimed in claim 1 wherein the third working surface is oriented at an angle of about 45° to each of the first and second working surfaces.

4. A T-square apparatus as claimed in claim 1 further comprising a second measuring blade and means for slidably mounting the second measuring blade on the frame in parallel relation to another of the working surfaces.

5. A T-square apparatus as claimed in claim 4 wherein the measuring blades are slidably mounted on the frame in parallel relation to the first and second working surfaces.

6. A T-square apparatus comprising:
   a generally triangular frame having
      a first generally flat rectangular working surface comprising a first slot extending the length of the first working surface in parallel relation to the side edges of the first working surface,
      a second generally flat rectangular working surface generally normal to the first working surface comprising a second slot extending the length of the second working surface in parallel relation to the side edges of the second working surface and in coplanar relation to the first slot, and,
      a third generally flat rectangular working surface oriented at about a 45° angle to each of the first and second working surfaces;
   a level vial mounted on the frame in parallel relation to each of the working surfaces;
   first and second measuring blades; and
   first means for slidably mounting the first measuring blade in the first slot in the frame so that the first measuring blade extends out of the first slot and one edge of the first measuring blade is above the first working surface, said first measuring blade being in parallel relation to the first working surface;
   second means for slidably mounting the second measuring blade in the second slot in the frame so that the second measuring blade extends out of the second slot and one edge of the second measuring blade above the second working surface, said second measuring blade being in parallel relation to the second working surface and in coplanar relation with the first measuring blade.

7. A T-square apparatus as claimed in claim 6 further comprising a generally L-shaped angle bar having first and second walls generally normal to each other, said angle bar being fixedly attached to one end of one of the measuring blades whereby the plane of the measuring blade is generally normal to the planes of the first and second walls.

8. A T-square apparatus as claimed in claim 6 wherein the means for mounting the level vials on the frame comprises a level vial holder having three compartments for receiving the three level vials in an orientation whereby the axis of the first vial is generally normal to the axis of the second vial and the axis of the third vial is at selected angles to the axes of the first and second vials, said level vial holder being mounted on the frame so that the first, second and third vials are in parallel relation to the first, second and third working surfaces of the frame respectively.

9. A T-square apparatus comprising:

a generally triangular frame having
  a first generally flat rectangular working surface comprising a first slot extending the length of the first working surface in parallel relation to the side edges of the first working surface,
  a second generally flat rectangular working surface generally normal to the first working surface comprising a second slot extending the length of the second working surface in parallel relation to the side edges of the second working surface and in coplanar relation to the first slot, and;
  a third generally flat rectangular working surface oriented at about a 45° angle to each of the first and second working surfaces;
a level vial holder mounted on the frame and comprising three compartments for receiving three level vials in an orientation whereby the axis of a first level vial is in parallel relation to the first working surface of the frame, the axis of a second level vial is in parallel relation to the second working surface of the frame and the axis of the third level vial is in parallel relation to the third working surface of the frame;
three level vials mounted in the three compartments of the level vial holder;
first and second measuring blades; and
first means for slidably mounting the first measuring blade in the first slot in the frame so that the first measuring blade extends out of the first slot, one edge of the first measuring blade being spaced apart, above the first working surface, said first measuring blade being in parallel relation to the first working surface;
second means for slidably mounting the second measuring blade in the second slot in the frame so that the second measuring blade extends out of the second slot, one edge of the second measuring blade being spaced-apart above the second working surface, said second measuring blade being in parallel relation to the second working surface and in coplanar relation with the first measuring blade.

* * * * *